United States Patent [19]

Pickenhagen

[11] 4,283,433

[45] Aug. 11, 1981

[54] FLAVORING WITH α,β-UNSATURATED ALDEHYDES

[75] Inventor: Wilhelm Pickenhagen, Chavannes-des-Bois, Switzerland

[73] Assignee: Firmenich SA, Geneva, Switzerland

[21] Appl. No.: 73,446

[22] Filed: Sep. 7, 1979

[30] Foreign Application Priority Data

Sep. 14, 1978 [CH] Switzerland ............................ 9632/78

[51] Int. Cl.³ ........................ A23L 1/226; A23L 1/231
[52] U.S. Cl. ........................................ 426/534; 568/448
[58] Field of Search ...................... 426/534; 260/601 R

[56] References Cited

U.S. PATENT DOCUMENTS

| 3,453,317 | 7/1969 | Marbet et al. ................. 260/601 R |
| 3,654,309 | 4/1972 | Thomas et al. ................. 426/534 X |
| 3,655,397 | 4/1972 | Parliment et al. ................. 426/534 |
| 3,704,714 | 12/1972 | Kallianos et al. ................. 426/534 X |
| 3,914,451 | 10/1975 | Schreiber et al. ................. 426/534 |
| 4,010,207 | 3/1977 | Hall et al. ................. 260/601 R |
| 4,021,411 | 5/1977 | Goetz et al. ................. 260/601 R |
| 4,041,185 | 8/1977 | Parliment ................. 426/534 |
| 4,145,366 | 3/1979 | Ichikawa et al. ................. 260/601 R |

OTHER PUBLICATIONS

Furia et al., Fenaroli's Handbook of Flavor Ingredients, 2nd Ed., vol. 2, 1975, pp. 64, 234, 248, 435, 445, CRC Press: Cleveland.

*Primary Examiner*—Joseph M. Golian
*Attorney, Agent, or Firm*—Pennie & Edmonds

[57] ABSTRACT

Use of α,β-unsaturated aldehydes selected from the group consisting of 2,6-dimethyl-oct-2-en-1-al, 2,5-dimethyl-oct-2-en-1-al, 2,5-dimethyl-hept-2-en-1-al and 2-ethyl-7-methyl-oct-2-en-1-al as flavor-modifying ingredients in the aromatization of foodstuffs, animal feeds or beverages.

4 Claims, No Drawings

FLAVORING WITH α,β-UNSATURATED ALDEHYDES

SUMMARY OF THE INVENTION

The present invention relates to certain α,β-unsaturated aldehydes possessing useful organoleptic properties, more specifically to
2,6-dimethyl-oct-2-en-1-al,
2,5-dimethyl-oct-2-en-1-al,
2,5-dimethyl-hept-2-en-1-al and
2-ethyl-7-methyl-oct-2-en-1-al.

The above compounds may be advantageously used in the flavour industry, namely as flavour-modifying ingredients for the aromatization of foodstuffs, animal feeds or beverages.

The following compounds are new:
2,5-dimethyl-oct-2-en-1-al,
2,5-dimethyl-hept-2-en-1-al and
2-ethyl-7-methyl-oct-2-en-1-al.

BACKGROUND OF THE INVENTION

Numerous aldehydic compounds are known in the art. For instance, dec-2-en-1-al is employed in the reconstitution of flavours of fruity type, especially of citrus-fruits, or in the manufacture of peach type aromas. Certain lower alkyl, α,β-unsaturated aldehydes, such as hex-2-en-1-al, namely in its trans isomeric form, is used in compositions of strawberry, banana, apple or apricot type. Other unsaturated aldehydes having the double bond in the β,γ- or γ,δ-position find an advantageous utilization in the reconstitution of creamy and fatty notes. Hept-4-en-1-al belongs to this class of derivatives.

U.S. Pat. No. 3,914,451 describes the use as flavouring ingredient of 2-butyl-but-2-en-1-al, a compound possessing a gustative taste of sweet, slightly roasted and fatty character reminiscent of hazelnuts.

THE INVENTION

I have now surprisingly discovered that the α,β-unsaturated aldehydes of the instant invention develop various gustative notes such as fatty, roasted, grilled, burnt, meaty or even woody notes. The taste thereof is also reminiscent, in certain instances, of that of nuts, with green nuances.

The four unsaturated aldehydes of the invention include 2,6-dimethyl-oct-2-en-1-al, which compound possesses a particularly powerful flavour note the character thereof being reminiscent of certain aspects of the taste of potatoes when freshly subjected to frying, more generally to fried foodstuffs. It has to be further noted in this respect that although 2,6-dimethyl-oct-2-en-1-al was described in the scientific literature—see Indian J. Chem. 4 (9) 393-5 (1966)—the interest thereof in the field of flavours was never recognized before.

Owing to their valuable flavour modifying properties, the α,β-unsaturated aldehydes of the invention can be used for the aromatization of foodstuffs and beverages of various nature. Typically, they can be used to impart, improve or modify the meaty and fatty notes of meat or meat-imitating products destined to human or animal consumption.

The above disclosed aldehydes can also be advantageously used for the aromatization of cereals, roasted cereals more particularly, wherein they develop or enhance a well appreciated fatty and oily note. In view of the above, they can also be used for flavouring dietetic foodstuffs, low-calorie foodstuffs e.g.

The α,β-unsaturated aldehydes of the instant invention can be further used for flavouring coffee or coffee imitating products wherein they contribute to develop an interesting woody flavour note. 2,5-Dimethyl-oct-2-en-1-al for example, may impart a taste and flavour reminiscent of those of trans-non-2-en-1-al—see e.g. U.S. Pat. No. 3,886,297.

Consequently, the instant invention relates to a method for imparting, improving or modifying the organoleptic properties of foodstuffs, animal feeds and beverages which comprises adding thereto a small but flavouring effective amount of at least one of the α,β-unsaturated aldehydes selected from the group consisting of
2,6-dimethyl-oct-2-en-1-al,
2,5-dimethyl-oct-2-en-1-al,
2,5-dimethyl-hept-2-en-1-al and
2-ethyl-7-methyl-oct-2-en-1-al.

The invention further relates to a method to impart, improve or modify the oily-green gustative note of foodstuff subjected to a frying process which comprises adding thereto as flavouring effective ingredient at least one of the α,β-unsaturated aldehydes set forth hereinabove.

The invention also provides a composition comprising a foodstuff, an animal feed or a beverage and at least one of the above mentioned unsaturated aldehydes.

Another object of the invention consists in a foodstuff, an animal feed or a beverage having a meaty taste which comprises having added thereto as flavour-modifying ingredient at least one of the above mentioned unsaturated aldehydes.

As new composition of matter, the invention provides finally the following compounds:
2,5-dimethyl-oct-2-en-1-al,
2,5-dimethyl-hept-2-en-1-al and
2-ethyl-7-methyl-oct-2-en-1-al.

PREFERRED EMBODIMENTS OF THE INVENTION

The proportions at which the said compounds can achieve interesting gustative effects may vary within wide limits. Generally, these proportions are of from about 0.01 to 2 ppm (parts per million) by weight based on the total weight of the material into which they are incorporated. Preferred proportions are of the order of about 0.1 or 0.2 ppm. These values, however, should not be interpreted restrictively and it should be understood by those skilled in the art that concentrations lower or higher than those indicated above may be used whenever it is desired to achieve special effects. It is moreover well known in the art that concentrations of a given flavourant depend on the nature of the specific material it is desired to aromatize and on the nature of the co-ingredients in a given flavour composition.

The aldehydes of the instant invention can be used on their own or in admixture with one or several flavouring coingredients. They are moreover frequently used in admixture with common edible solvents, such as ethyl alcohol, dipropylene-glycol or triacetine e.g.

The α,β-unsaturated aldehydes set forth hereinabove can be obtained in accordance with current methods, for example by means of aldol condensation of the appropriate saturated aldehydes or by cleavage of certain Schiff bases following the so-called Wittig type aldolisation as described in "Neue Methoden der präparativen organischen Chemie" Vol. VI, W. Forst Editor, Verlag Chemie, pages 56–57. The thus prepared unsaturated aldehydes were characterized as follows:

2,5-Dimethyl-hept-2-en-1-al

MS: m/e: 140 (3.5); 125 (8); 111 (15); 84 (100); 83 (23); 71 (17); 70 (24); 57 (62); 55 (47); 41 (69); 29 (59);

IR: 2995, 2900, 1685, 1640, 1460 cm$^{-1}$;

NMR: 9.41 (s, 1H); 6.52 (1H, t, J=7.5 Hz); 2.32 (2H, t, J=7.5 Hz); 1.75 (broad s, 3H); 1.1–1.6 (3H, m); ca. 0.98 (6H) δppm.

2,5-Dimethyl-oct-2-en-1-al

MS: m/e: 125 (6.9); 111 (8); 96 (8); 84 (100); 83 (15); 71 (24.5); 56 (23); 55 (43); 43 (100);

IR: 2980, 2950, 2900, 1685, 1640, 1460 cm$^{-1}$;

NMR: 9.33 (s, 1H); 6.48 and 6.46 (2 combined t, J=9 Hz, 1H); 2.1–2.45 (m, 2H); 1.73 (broad s, 3H); 1.1–1.4 (m, 5H); 0.89–0.96 (6H) δppm.

2-Ethyl-7-methyl-oct-2-en-1-al

MS: m/e: 168 (9); 153 (7); 135 (7); 126 (11.5); 125 (17); 111 (36); 98 (38); 85 (48); 83 (63); 84 (64); 69 (69); 57 (48); 55 (81); 43 (100); 41 (93);

IR: 2980, 2900, 1685, 1640, 1460 cm$^{-1}$;

NMR: 9.30 (s, 1H); 6.35 (t, J=7 Hz, 1H); 2.2–2.45 (m, 4H); 1.2–1.6 (m, 6H); 0.9–1.1 (8H); δppm.

2,6-Dimethyl-oct-2-en-1-al

MS: m/e: 125 (3); 107 (3.5); 97 (40); 84 (100); 83 (38); 71 (33); 69 (46); 55 (80); 43 (77); 41 (69);

IR: 2995, 2900, 1685, 1640, 1460 cm$^{-1}$;

NMR: 9.35 (s, 1H); 6.48; 6.46 (2 combined t, J=8 Hz, 1H; 2.40; 2.30 (2 combined t, J=8 Hz, 2H); 1.73 (broad s, 3H); 1.1–1.6 (m, 5H); 0.95 (broad s, 6H) δppm.

The saturated aldehydes used as starting material for the preparation of the afore-mentioned compounds, viz. 3-methyl-hexanol, 4-methyl-hexanal and 5-methyl-hexanal were obtained from the corresponding alcohols, after oxidation thereof according to the method disclosed in Tetrahedron Letters 1975, 2647. The literature relevant for the preparation of the said alcohols is indicated hereinafter.

| 3-methyl-hexanol | Beilstein 1 (II), 445 |
| 4-methyl-hexanol | DE-OS 25 58 657 |
| 5-methyl-hexanol | Chem.Abstr. 35, 2479$^2$ |

The invention will be better illustrated by the following examples.

EXAMPLE 1

The compounds listed hereinafter were used for the aromatization of salted water (0.5% sodium chloride in water). The following table summarizes the opinion expressed by the panel of experienced flavourists who conducted the organoleptic evaluation.

| Compound tested | Dosage (ppm) | Evaluation comments |
| --- | --- | --- |
| 2,6-dimethyl-oct-2-en-1-al | 0.15 | strong fried oil character, fried potato, beef fat, nutty, roasted, peanut |
| 2,5-dimethyl-oct-2-en-1-al | 0.10 | strong, woody, fatty, green, roasted fat, coffee |
| 2,5-dimethyl-hept-2-en-1-al | 0.20 | green, fatty, nutty, meat-like |
| 2-ethyl-7-methyl-oct-2-en-1-al | 0.10 | strong fatty-waxy character, burnt fat, green, oily. |

EXAMPLE 2

A commercial meat broth was flavoured by making use of the compounds cited hereinafter at the given concentrations and then subjected to an organoleptic evaluation by comparison with an unflavoured sample. The following table summarizes the opinion expressed by the panel of experienced flavourists who conducted the organoleptic evaluation.

| Compound tested | Dosage (ppm) | Evaluation comments |
| --- | --- | --- |
| 2,6-dimethyl-oct-2-en-1-al | 0.10 | more fatty and meaty; more roasted character |
| 2,5-dimethyl-oct-2-en-1-al | 0.10 | more fatty; enhanced beef gravy character; richer |
| 2-ethyl-7-methyl-oct-2-en-1-al | 0.05 | fatty, meaty; more grilled character |

EXAMPLE 3

A sample of commercial peanut butter was flavoured with 2,6-dimethyl-oct-2-en-1-al at a concentration of 0.2 ppm and then subjected to evaluation by comparison with an unflavoured sample. It was observed that the flavoured sample showed an enhanced peanut character, particularly in the green, earthy and roasted notes typical of peanut.

EXAMPLE 4

A soluble coffee of commercial origin was flavoured by making use of 2,5-dimethyl-oct-2-en-1-al at a concentration of 0.01 ppm (based on the ready to drink beverage) and then compared with a similarly prepared coffee without added flavouring agent. It was noted that the flavoured beverage showed enhanced overall coffee flavour and aroma, in particular in the green, woody and burnt notes typical of freshly ground coffee.

EXAMPLE 5

A sample of pasteurized milk of commercial origin was flavoured with 2,5-dimethyl-oct-2-en-1-al at a concentration of 0.02 ppm and then compared with an unflavoured sample of the same milk. It was first observed that the flavoured milk had a more intense and creamy odour than that of the unflavoured sample. It was further noted that the flavoured milk possessed a fuller, more creamy-oily and slightly nut-like flavour.

EXAMPLE 6

A sample of industrial (unflavoured) margarine was flavoured by making use of 2,5-dimethyl-oct-2-en-1-al at a concentration of 0.05 ppm and then subjected to an organoleptic evaluation by comparison with an unflavoured sample of the same margarine. The flavoured sample was found to be more rounded in flavour and taste, fresher, more creamy and more fatty-oily than the unflavoured sample.

EXAMPLE 7

Several portions of a commercial hydrogenated vegetable oil having a bland taste were flavoured by making use of the compounds cited hereinafter, at the following concentrations:

| | |
|---|---|
| A: 2,6-dimethyl-oct-2-en-1-al | 1.0 ppm |
| B: 2,5-dimethyl-oct-2-en-1-al | 1.0 ppm |
| C: 2-ethyl-7-methyl-oct-2-en-1-al | 0.5 ppm |

Samples of extruded corn snacks, based on 75% corn and 25% dehydrated potato powder, were then coated with the said oil portions in the following proportions (parts by weight):

| Ingredients | Sample A | B | C | D[1] |
|---|---|---|---|---|
| Extruded snack | 80 | 80 | 80 | 80 |
| Oil flavoured with A | 20 | — | — | — |
| Oil flavoured with B | — | 20 | — | — |
| Oil flavoured with C | — | — | 20 | — |
| Unflavoured oil | — | — | — | 20 |
| Total | 100 | 100 | 100 | 100 |

[1]control material

The four samples were then subjected to an organoleptic evaluation, the opinion expressed by the panel of experienced flavourists being summarized in the following table.

| Sample | Dosage[1] | Evaluation comments |
|---|---|---|
| A | 0.2 ppm | enhanced flavour; more oily, and roasted peanut than D |
| B | 0.2 ppm | more fried flavour note than D; more oily and nutty |
| C | 0.1 ppm | more oily "french fry" character than D; slightly meaty |

[1]dosage of the flavouring ingredient in the finished snack

What I claim is:

1. A method for imparting, improving or modifying the organoleptic properties of foodstuffs, animal feeds and beverages which comprises adding thereto from about 0.01 to 2 ppm based on the weight of said foodstuff, animal feed or beverage of at least one of the $\alpha,\beta$-unsaturated aldehydes selected from the group consisting of
2,6-dimethyl-oct-2-en-1-al,
2,5-dimethyl-oct-2-en-1-al,
2,5-dimethyl-hept-2-en-1-al and
2-ethyl-7-methyl-oct-2-en-1-al.

2. Composition comprising a foodstuff, an animal feed or a beverage and from about 0.01 to 2 ppm based on the weight of said foodstuff, animal feed or beverage of at least one of the $\alpha,\beta$-unsaturated aldehydes selected from the group consisting of 2,6-dimethyl-oct-2-en-1-al, 2,5-dimethyl-oct-2-en-1-al, 2,5-dimethyl-hept-2-en-1-al and 2-ethyl-7-methyl-oct-2-en-1-al.

3. A foodstuff, an animal feed or a beverage having a meaty taste which comprises having added thereto from about 0.01 to 2 ppm based on the weight of said foodstuff, animal feed or beverage as flavour-modifying ingredient at least one of the $\alpha,\beta$-unsaturated aldehydes selected from the group consisting of 2,6-dimethyl-oct-2-en-1-al, 2,5-dimethyl-oct-2-en-1-al, 2,5-dimethyl-hept-2-en-1-al and 2-ethyl-7-methyl-oct-2-en-1-al to impart, improve or modify the meaty and fatty notes thereof.

4. A method to impart, improve or modify the oily-green gustative note of foodstuff subjected to a frying process which comprises adding thereto from about 0.01 to 2 ppm based on the weight of said foodstuff, animal feed or beverage as flavouring effective ingredient at least one of the $\alpha,\beta$-unsaturated aldehydes selected from the group consisting of 2,6-dimethyl-oct-2-en-1-al, 2,5-dimethyl-oct-2-en-1-al, 2,5-dimethyl-hept-2-en-1-al and 2-ethyl-7-methyl-oct-2-en-1-al.

* * * * *